(12) United States Patent
Fahrian et al.

(10) Patent No.: US 6,629,545 B1
(45) Date of Patent: Oct. 7, 2003

(54) CUT-OFF VALVE FOR POWER STEERING SYSTEMS, ESPECIALLY FOR AUTOMOBILES

(75) Inventors: Matthias Fahrian, Bartholomä (DE); Jörgen Schöffel, Schwäbisch Gmünd (DE)

(73) Assignee: ZF Lenksysteme GmbH, Schwaebisch Gmuend (DE)

( * ) Notice: Subject to any disclaimer, the term of this patent is extended or adjusted under 35 U.S.C. 154(b) by 131 days.

(21) Appl. No.: 10/018,541
(22) PCT Filed: Nov. 23, 2000
(86) PCT No.: PCT/EP00/11674
  § 371 (c)(1),
  (2), (4) Date: Oct. 30, 2001
(87) PCT Pub. No.: WO01/38159
  PCT Pub. Date: May 31, 2001

(30) Foreign Application Priority Data

Nov. 25, 1999 (DE) .......................................... 199 56 858

(51) Int. Cl.$^7$ ................................................. B62D 5/06
(52) U.S. Cl. ..................... 137/601.2; 137/881; 180/417
(58) Field of Search ............................ 137/601.2, 881, 137/883; 180/417

(56) References Cited

U.S. PATENT DOCUMENTS

| | | | | |
|---|---|---|---|---|
| 3,559,678 A | * | 2/1971 | Donner | 137/601.2 |
| 4,217,932 A | * | 8/1980 | Bacardit | 137/625.21 |
| 4,718,733 A | * | 1/1988 | Fujita et al. | 180/170 |
| 5,531,286 A | * | 7/1996 | Majer et al. | 180/441 |

FOREIGN PATENT DOCUMENTS

| | | |
|---|---|---|
| DE | 42 16 053 | 11/1993 |
| DE | 42 30 960 | 3/1994 |
| GB | 2 183 571 | 6/1987 |

* cited by examiner

*Primary Examiner*—Stephen M. Hepperle
(74) *Attorney, Agent, or Firm*—Kenyon & Kenyon

(57) ABSTRACT

A cut-off valve for power steering systems, especially for automobiles, includes a source of a pressure and a container, and is used for limiting a pressure in at least one pressure chamber. The cut-off valve also includes a closing body, which may be adjusted against the force of a spring and a fixed throttling point, which is located in a connecting line between the pressure chamber that is subjected to a first pressure and a pressure chamber that is subjected to a second pressure. The cross-section of the throttling point may be regulated without being disassembled from the outside. By altering the cross-section of the throttle point, it is possible to reduce the width of the tolerance zone or the width of the hysteresis of the valve characteristics to approximately half of the original size.

8 Claims, 2 Drawing Sheets

CUT-OFF VALVE FOR POWER STEERING SYSTEMS, ESPECIALLY FOR AUTOMOBILES

FIELD OF THE INVENTION

The present invention relates to a cut-off valve for power steering systems, in particular for automobiles, for limiting the pressure in at least one pressure chamber. The cut-off valve includes a piston that is adjustable against the force of a spring, and a fixed throttling point, which is arranged in a connecting line between a pressure chamber to which a first pressure is applied and a second pressure chamber to which a second pressure is applied.

BACKGROUND INFORMATION

A cut-off valve of this type is described in German Published Patent Application No. 42 16 053, in which it is possible to avoid response pressure tolerances of the cut-off valve almost completely. Moreover, manufacturing tolerances of the cut-off valve can be eliminated through this, and further tolerances of other steering components can be compensated for.

However, the conventional measures have no influence over the width of the tolerance field of the valve characteristics. When the conventional cut-off valve is applied, the hysteresis of the valve characteristics is too large for some applications.

It is an object of the invention to improve the cut-off valve so that the width of the tolerance field of the valve characteristics may be reduced to at least 50%.

SUMMARY

The above and other beneficial objects of the present invention are achieved by providing a cut-off valve, in which the cross-section of the throttling point is made externally adjustable without dismantling. Through changing the cross-section of the throttling point it is possible to reduce the width of the tolerance field, or the width of the hysteresis of the valve characteristics respectively, so that it amounts to approximately half of the previous value.

The cross-section of the throttling point may either be infinitely adjustable or adjustable in multiple steps. Infinite adjustment may be effected very simply in that the throttling point is formed by a bore, the cross-section of which is, for example, adjustable by an adjusting screw or an adjusting member, the axis of which is substantially perpendicular to the axis of the bore. In this example embodiment, the cross-section of the bore is altered in that the adjusting screw is turned in to a greater or lesser depth.

Stepped adjustment of the cross-section of the throttling point may be effected by the following characteristics: The throttling point is formed by one of multiple throttle bores that are arranged on a rotatable, cylindrical adjusting member in one plane, spaced at a certain angular pitch, and which have varying cross-sections. One of the throttle bores acts in conjunction with a larger fixed bore in the housing, whereas the other throttle bores are closed. Finally, one of the throttle bores is arranged in the connecting line between the retroaction chamber and the return line to the container. For production reasons the throttle bores may be arranged in the rotatable adjusting member in one plane and at equal angular distances.

DETAILED DESCRIPTION

Figure 1:
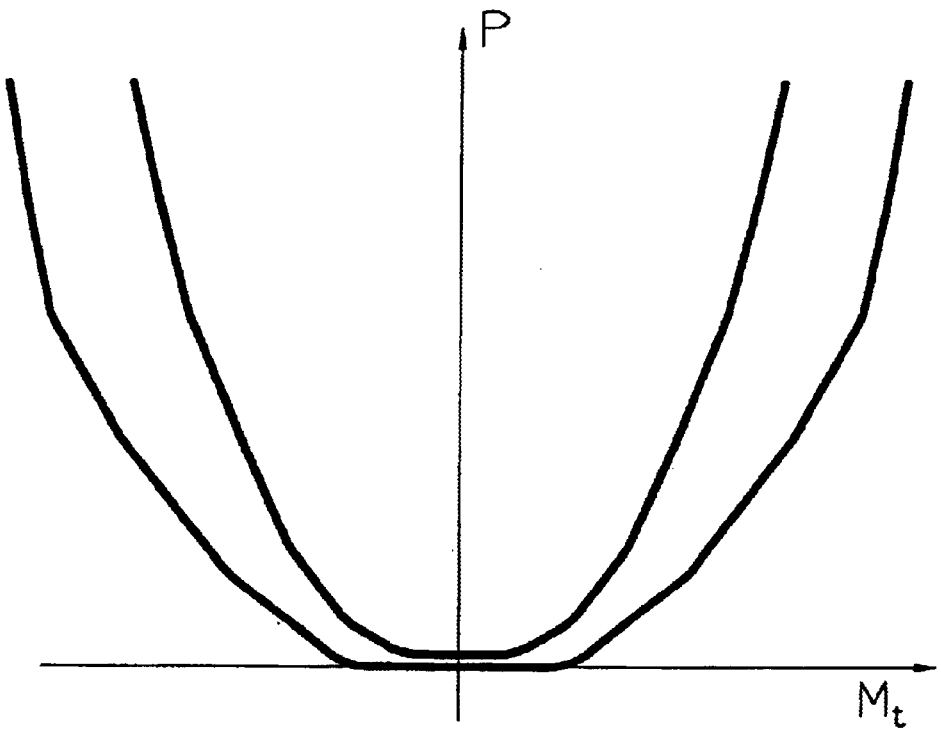
FIG. 1 illustrates a valve characteristic of a power steering system having a conventional cut-off valve.

The power steering system, in which the cut-off valve according to the present invention is installed, is illustrated with only one source for a pressure medium 1, one retroaction chamber 2 and one container 3. Further components of the power steering system, which are however not necessary to understand the present invention, are described and illustrated, for example, in German Published Patent Application No. 42 16 053. Essential for the invention is the presence of two pressure chambers that are pressurised to different pressure levels. One pressure chamber is the retroaction chamber 2 and the second one is the container 3.

Cut-off valve 4 includes in a valve housing 5 a blocking member 6, upon which the force of a spring 7 acts, which forces it into its closed position.

The direct connection between retroaction chamber 2 to container 3 is cut off by blocking member 6. This connection includes a line 8 that is arranged between the retroaction chamber 2 and the valve housing 5. The line 8 ends in an annular groove 10 of valve housing 5, which is connected via multiple boreholes 11 to the inner cavity 12 of valve housing 5. The connection between retroaction chamber 2 and container 3 continues through a spring chamber 13 and a line 14.

The cut-off valve 4 is configured according to the pressure balance principle. Different levels of pressure are applied to each of the end faces of blocking member 6. The return pressure from container 3 is applied to the end face of blocking member 6 located in spring chamber 13. The pressure between that of the retroaction chamber 2 and that of container 3 is applied to that end face of blocking member 6 that is located in the inner cavity 12 of valve housing 5. To obtain this pressure in the inner cavity 12, a throttling point 15 is arranged between inner cavity 12 and container 3, in which the throttling point 15 is connected with container 3 via line 16. The cross-section of throttling point 15 is adjustable.

Figure 3:
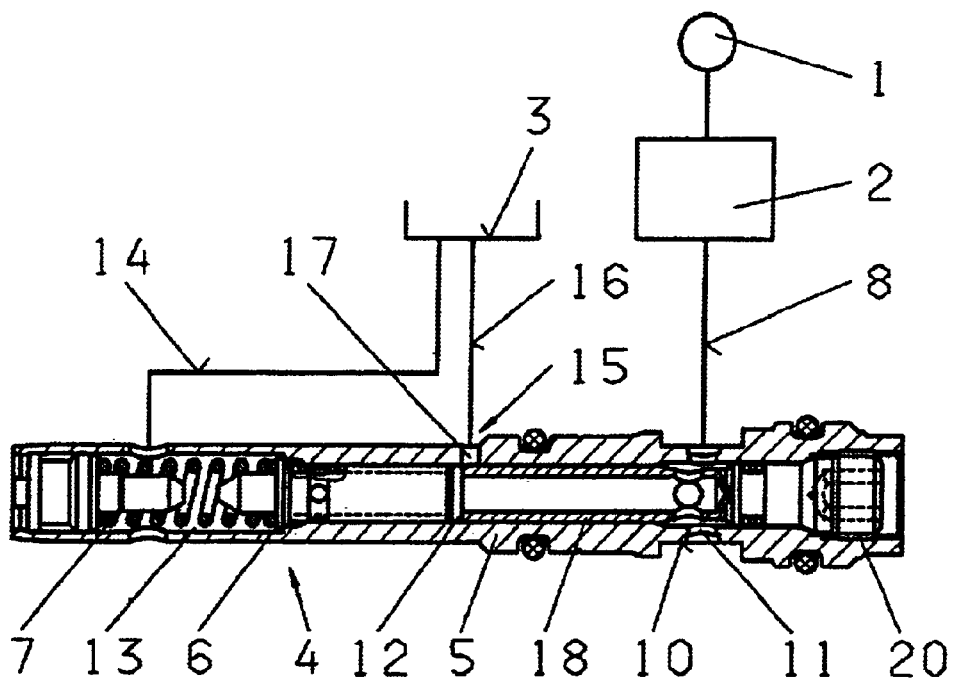
FIG. 3 is a schematic longitudinal cross-sectional view of a first example embodiment of a cut-off valve according to the present invention.

In the example embodiment illustrated in FIG. 3, the throttling point 15 may be made adjustable in that the throttling point 15 is formed by a borehole 17 in valve housing 5, the cross-section of which may be altered by an adjusting member 18 that is inserted into the inner cavity 12.

In the example embodiment illustrated in FIG. 3, the adjusting member 18 takes the form of an adjusting screw, the axial position of which may be changed via a thread 20. FIG. 3 illustrates the adjusting member 18 in a position in which borehole 17 is fully closed. Thus, the cross-section of throttling point 15 equals zero. Through turning the throttling point 15 out of its thread 20, the cross-section of throttling point 15 may be increased. This arrangement permits a very accurate adjustment and reduction of the tolerance field width of the valve characteristics.

Figure 2:
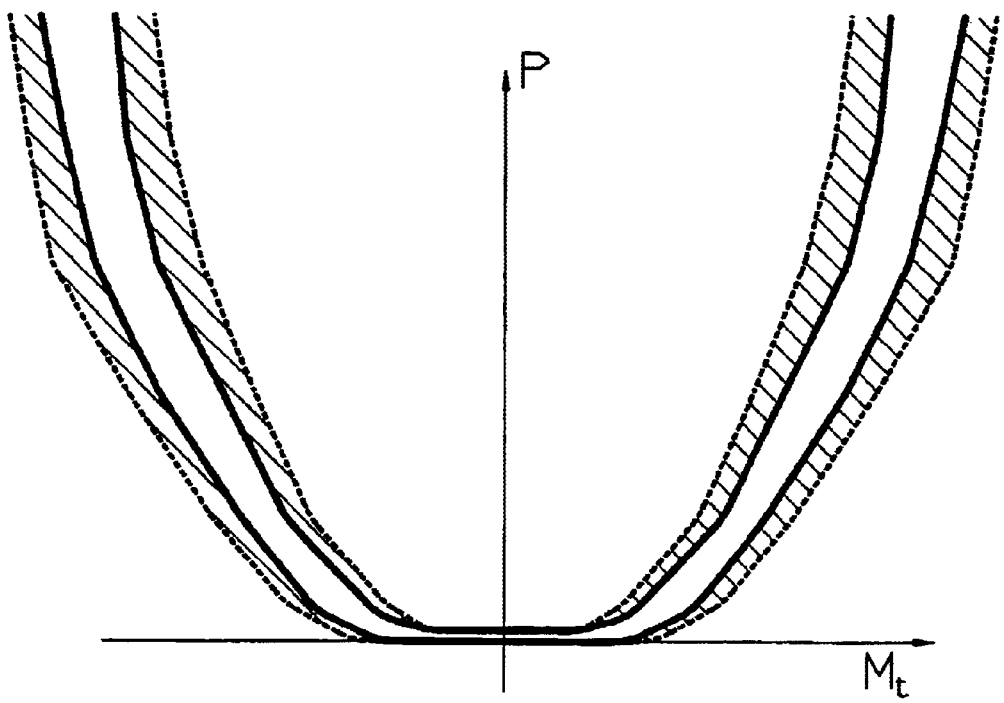
FIG. 2 illustrates a valve characteristic of a power steering system having a cut-off valve according to the present invention.

The tolerance field width that is achievable with the cut-off valve according to the present invention is illustrated in FIG. 2, which indicates that the tolerance field width of the valve characteristics is smaller by the hatched area than the tolerance field width of a conventional cut-off valve, as illustrated in FIG. 1.

Figure 4:
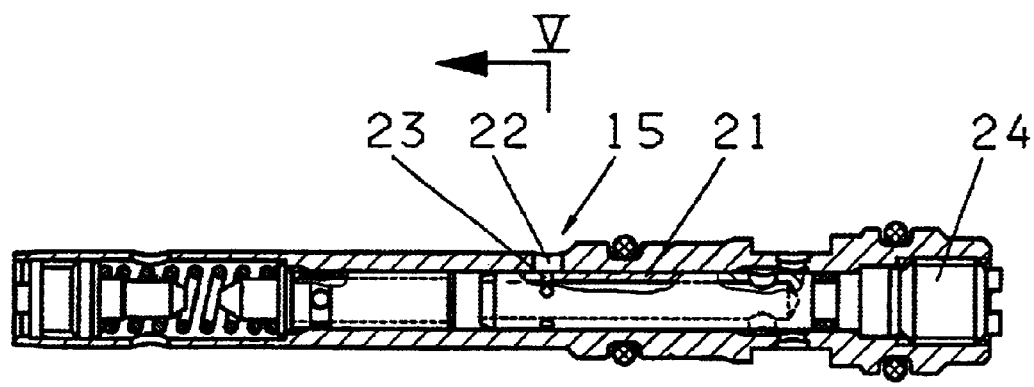
FIG. 4 is a schematic longitudinal cross-sectional view of a second example embodiment of a cut-off valve according to the present invention.
Figure 5:
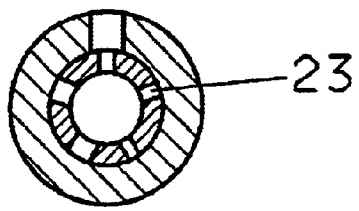
FIG. 5 is a cross-sectional view of the cut-off valve taken along the line V—V illustrated in FIG. 4.

In the example embodiment illustrated in FIG. 3, the throttling point 15 is infinitely variable. In contrast, in the example embodiment illustrated in FIG. 4, the throttling point 15 is adjustable in multiple steps. With this example embodiment, it is possible to provide an adjusting member 21 with fixed settings of throttle cross-sections that have been recognized as advantageous. In this example embodiment, a bore 22 with a larger diameter is provided in valve housing 5. One of a number of throttle bores 23 may be made to connect with the borehole 22. The throttle bores 23 are arranged in the adjusting member 21 in one plane and at a certain angular pitch. A uniform angular pitch may be used. The throttle bores 23 have different diameters. The adjusting member 21 may be rotated such that each time one of the throttle bores 23 is connected with borehole 22. After such an adjustment, the adjusting member 21 may be fixed with a locking screw 24.

If the pressure medium source 1 is connected directly or indirectly to the boreholes 17 or 22 respectively instead of container 3, the throttling point 15 acts as a pilot throttle through which the pressure in the retroaction chamber may be adjusted. This arrangement makes it possible to influence the position of the valve characteristic in the tolerance band, in a corresponding manner such as in the example embodiments illustrated in FIGS. 3 and 4.

What is claimed is:

1. A cut-off valve for a power steering system having a pressure medium source and a container, the cut-off valve being configured to limit a pressure in at least one pressure chamber, comprising:
   a spring;
   a blocking member configured to be adjustable against a force of the spring; and
   a fixed throttling point arranged in a connecting line between a pressure chamber to which a first pressure is applied and a second pressure chamber to which a second pressure is applied, a cross-section of the throttling point being configured to be externally adjustable without dismantling; wherein the blocking member, spring, and throttling point are arranged coaxially in a housing.

2. The cut-off valve according to claim 1, wherein the throttling point includes a borehole having an infinitely adjustable cross-section.

3. The cut-off valve according to claim 2, further comprising an adjusting member having an axis substantially perpendicular to an axis of the borehole, the cross-section of the borehole being adjustable by the adjusting member.

4. The cut-off valve according to claim 3, wherein the adjusting member includes an axially adjustable adjusting screw.

5. The cut-off valve according to claim 1, wherein the throttling point includes one of a plurality of throttle bores, the throttle bores being arranged on a rotatable, cylindrical adjusting member in a single plane and at an angular pitch, each throttle bore having a different cross-section;
   wherein one of the throttle bores is configured to act in conjunction with a larger borehole while remaining throttle bores are closed; and
   wherein one of the throttle bores is arranged in the connecting line between the first chamber and the second chamber.

6. The cut-off valve according to claim 5, wherein the throttle bores are arranged on the rotatable adjusting member in a single plane and at an equal angular pitch.

7. The cut-off valve according to claim 1, wherein the first chamber includes a retroaction chamber and the second chamber includes the container.

8. The cut-off valve according to claim 1, wherein the first chamber includes the pressure medium source and the second chamber includes a retroaction chamber.

* * * * *